United States Patent
Costello (10) Patent No.: US 6,962,454 B1
(45) Date of Patent: Nov. 8, 2005

(54) KEYBOARD PROTECTIVE COVER (76) Inventor: Pamella A. Costello, 86 W. 34th St., Bayonne, NJ (US) 07002

( * ) Notice: Subject to any disclaimer, the term of this patent is extended or adjusted under 35 U.S.C. 154(b) by 114 days.

(21) Appl. No.: 09/823,430

(22) Filed: Mar. 30, 2001

Related U.S. Application Data (60) Provisional application No. 60/194,513, filed on Apr. 4, 2000.

(51) Int. Cl.$^7$ ............................................. B41J 29/12
(52) U.S. Cl. ..................................... 400/713; 400/692
(58) Field of Search ............................... 400/714, 713, 400/691–693; 200/302.2, 302.3, 302; 235/146; 379/447, 451

(56) References Cited

U.S. PATENT DOCUMENTS

| | | | |
|---|---|---|---|
| 2,984,725 A | 5/1961 | Hubbell et al. ........... 200/302.3 |
| 3,372,246 A | 3/1968 | Knuepfer ..................... 379/368 |
| 3,657,492 A * | 4/1972 | Arndt et al. .............. 200/302.2 |
| 4,039,068 A | 8/1977 | Giorza et al. .................. 197/98 |
| 4,158,130 A * | 6/1979 | Speraw et al. ............... 235/146 |
| 4,261,401 A | 4/1981 | Hickey ......................... 150/52 |
| 4,352,968 A | 10/1982 | Pounds ........................ 200/302 |
| 4,396,830 A | 8/1983 | Isozaki et al. ............... 235/145 |
| 4,436,965 A | 3/1984 | Morse .......................... 179/184 |
| 4,438,300 A | 3/1984 | Morse .......................... 179/184 |
| 4,471,189 A | 9/1984 | Bacon et al. ................. 200/159 |
| 4,501,936 A | 2/1985 | Morse .......................... 179/184 |
| 4,555,600 A | 11/1985 | Morse .......................... 179/184 |
| 4,758,712 A | 7/1988 | Matone, Jr. et al. ......... 235/145 |
| 4,768,230 A | 8/1988 | Viebrantz et al. ........... 455/603 |
| 4,862,979 A * | 9/1989 | Borchard ..................... 177/181 |
| 4,922,980 A | 5/1990 | Parker ......................... 150/165 |
| 5,021,638 A | 6/1991 | Nopper et al. .............. 234/145 |

(Continued)

FOREIGN PATENT DOCUMENTS

GB 2 152 437 A 8/1985

Primary Examiner—Anthony H. Nguyen
(74) Attorney, Agent, or Firm—Lerner, David, Littenberg, Krumholz & Mentlik, LLP (57) ABSTRACT A protective cover or envelope for a keyboard array that prevents entry of contaminants such as water, foodstuffs, chemical compounds, including medical or pharmaceutical compositions in the form of fluids or solids, dust and the like into the interior of the keyboard assembly from the keypad top deck. A membrane of a resilient, substantially transparent, material, such as an elastomeric polyolefin, is used to form a one-piece cover that extends over the keyboard array and preferably at least a portion of the obverse face of the keyboard assembly and acts to drape or enshroud the keyboard assembly on its upper face or deck. Preferably the elastomeric cover is an envelope-like membrane structure of generally uniform thickness and is constructed in a shape that when stretched to receive the keyboard, it covers the top portion of the key array as well as extending at least partially down the side walls of the keyboard and is in proximate contact with the top deck of the keyboard assembly. The "touch" and "feel" of the individual keys is retained with the protective cover in its operative position, including keys of ordinary construction as well as those used with a Braille system of markings on the surfaces of the keys. As a consequence of its elastomeric properties, a single keyboard cover can be used with keyboards having different key patterns, e.g., different models from a single manufacturer or different keyboards from different manufacturers. The attractive economics and broad applicability achievable with the cover of the present invention also permits an individual user to retain a personal keyboard cover for a use with various keyboards.

19 Claims, 2 Drawing Sheets

U.S. PATENT DOCUMENTS

| | | | |
|---|---|---|---|
| 5,080,155 A | 1/1992 | Crozier | 150/154 |
| 5,096,317 A * | 3/1992 | Phillippe | 200/304 |
| 5,193,924 A * | 3/1993 | Larson | 400/472 |
| 5,383,643 A * | 1/1995 | Koch | 248/447 |
| 5,527,122 A * | 6/1996 | Carter | 400/496 |
| 5,551,497 A * | 9/1996 | Stanley | 150/154 |
| 6,285,299 B1 * | 9/2001 | King-DeBaun | 150/154 |
| 2001/0041088 A1 * | 11/2001 | Lebeau et al. | 400/691 |

* cited by examiner

KEYBOARD PROTECTIVE COVER

CROSS-REFERENCE TO RELATED APPLICATIONS

The present application claims benefit of U.S. Provisional Application No. 60/194,513, filed Apr. 4, 2000.

BACKGROUND OF THE INVENTION

The present invention relates generally to environmental protective devices and specifically to covers for computer keyboards, keypads and the like.

In recent years the use of keyboards has increased dramatically for industrial, business and personal applications. Keyboards are an integral part of many machines such as word processing devices, personal computers (PCs), typewriters, calculators, touch tone telephone devices and the like. Furthermore, keyboards linked to, e.g., PCs are finding increasing use in environments and under conditions where they, or those using them, are in the presence of contaminants that can be injurious to proper keyboard function. Such environments include, for example, industrial or commercial kitchens, hospital preparation and operating rooms, chemical and industrial processes, etc.

Although keyboard displays vary from device-to-device, each represents a series or array of keys which are movable through a top deck portion of the keyboard and movement of one or more keys generates an electrical or mechanical signal. However the presence of passages in the deck portion in the vicinity of the movable keys permits access of various contaminants such as water, foodstuffs, chemical compounds (including medical or pharmaceutical products in the form of fluids or solids), dust and the like to the interior of the keyboard. The entry of contaminants such as these affects the internal operation of the keypad resulting in malfunction of the keyboard and its associated or linked equipment, e.g., a computer central processing unit. It is therefore one of the objects of the present invention to provide a keyboard cover that prevents or significantly inhibits or minimizes the entry of contaminants into the interior of the keyboard, especially in those passages between the keys and the deck of the keyboard. It is another object to provide a keyboard cover that permits an operator to retain the touch and feel of the keys while protecting the keyboard from contaminants. It is a further objective of the invention to provide a keyboard cover that permits a link, including an optical link, between the keyboard and a related processor.

The prior art has attempted to restrict entry of contaminants into the interior of a keyboard by the use of an elastomeric boot or cover such as is described in U.S. Pat. Nos. 3,372,246, 4,039,068, 4,436,965, 4,438,300, 4,501,936, 5,021,638 and 5,080,155.

Although each of these prior art attempts provides a cover or boot that aids in reducing or eliminating the entry of contaminants, these prior art approaches either had limited success in solving the problem or did so in a cumbersome and/or expensive manner. One failure of the prior art is that the "touch" or "feel" of the keyboard, as is normally associated by the operator of the keyboard with each individual key, is lost due to the type of cover material employed by the prior art. Thus, deprivation of the keyboard operator's sense of touch or feel of the individual keys was a significant drawback associated with the keyboard covers of the prior art. One particular drawback of prior art covers was the requirement of a separately molded cover to be manufactured for each keyboard array available on the market (currently numbering approximately three thousand); an expensive solution for the manufacturer, distributor and end-user. Consequently, upgrading or replacing the keyboard usually also required replacing the keyboard cover and a keyboard cover useful with one keyboard could rarely, if ever, be used with another.

Another prior art attempt at providing a keyboard cover was concerned with providing an overlay or "mask" on the keyboard such that new indicia were provided on the cover which differed from the indicia found on the original keyboard (Great Britain published application Ser. No. 2,152,437A). Although such a keyboard cover, or mask, was capable of covering the keys, it was the objective of such a device to facilitate translation of the keys and they were not effective in preventing contaminants from entering the interior of the keyboard.

Additional prior art attempts to provide means to prevent contamination of keyboards can be found in U.S. Pat. Nos. 3,657,492, 4,352,968 and 4,396,830. However, none of these attempts provides a satisfactory cover for preventing contamination of the interior of the keyboard while preserving the "touch" or "feel" of the individual keys of the keyboard and doing so in a practical, straightforward and economical manner.

While the above references disclosed certain aspects of a protective keyboard cover, there still exists a need for a keyboard cover that avoids the undesirable loss of touch and feel of the keys and maximizes the usefulness of the cover with a broad array of keyboards under a variety of circumstances. For these and other reasons the search has continued in order to develop an improved keyboard cover.

SUMMARY OF THE INVENTION

A protective enclosure or cover for a keyboard assembly having a plurality of keys on a top face thereof, and an obverse face opposite said top face and, optionally, a means to provide communication between said keyboard and an external device; said enclosure having an envelope-like structure comprising at least a top panel, two vertical side panels, a vertical front panel and a vertical rear panel, said enclosure of a size to receive said keyboard when said enclosure is minimally stretched, wherein said top panel comprises a thin, elastomeric and substantially transparent membrane in proximate contact with said keys of said keyboard.

The objects identified above, as well as others, are achieved by providing a keyboard assembly cover or enclosure in the form of a thin, but strong, membrane comprised of one or more elastomeric compositions, wherein the enclosure is comprised of top, vertical side, front and back panels and, optionally a bottom panel of a size to cover all or substantially all of the obverse face of the keyboard, so as to provide a protective cover for the keys of the keyboard array.

In a particularly preferred embodiment of the invention, the membrane keyboard cover is formed so as to extend over the keys and the deck portion of the keyboard, down the vertical sides of the keyboard and at least partially onto the obverse face of the keyboard. The membrane is in close proximity to the top surface of the keys, for example either not touching, but only slightly removed from the top surface of the keys, or only lightly touching the keys. In this manner the keyboard cover does not affect either the operator's "touch or feel" of the keys or the mechanical or electronic action of the keys, i.e., the keys are not prone to inadvertent activation by the keyboard cover itself. In a further preferred embodiment, the protective keyboard cover extends from the top deck, down the vertical sides of the keyboard and onto a substantial portion of the obverse face of the keyboard assembly to thereby be held in place by the elastomeric recovery forces generated by the stretched keyboard cover.

It is a further embodiment of the present invention to provide a low-cost membrane keyboard assembly cover wherein the "touch" or "feel" of the individual keys of the keyboard assembly is retained when the membrane cover is in its operative position.

It is still a further embodiment of the present invention to provide a keyboard cover suitable for use by persons requiring raised character indicators on the surfaces of the keys, for example in connection with a Braille system keyboard.

These and other embodiments of the present invention will be more fully understood by reference to the drawings, detailed description and preferred embodiments described hereinbelow.

BRIEF DESCRIPTION OF THE DRAWINGS

Additional advantages and features of the present invention will be apparent and fully understood from a reading of the following description taken together with the annexed drawings in which.

DETAILED DESCRIPTION

While the art discloses many variations of keyboard covers, none have taken full advantage of the unique characteristics of polymeric materials, particularly recent advances relating to the border between elastic and plastic behavior achievable using thin but strong, and where suitable, low modulus, film-based structures. For example, the prior art protective cover described in U.S. Pat. No. 5,021, 638, is molded to fit the specific key array of the keyboard to which the protective cover is applied. Such an approach to solving the problem of protecting a keyboard from the intrusion of damaging materials is particularly limiting. Specifically, the reference uses permanent, molded-in impressions in the cover that are designed to mate solely with the specific key array of a particular keyboard. Consequently, large numbers of such molded keyboard covers are required, each one corresponding to a different keyboard array and using a different, expensive mold. Furthermore, the differently configured keyboard covers have to be kept in inventory by the manufacturer, marketer and seller; and the user must discard the cover if the keyboard is upgraded or replaced with an improved, albeit even slightly differently configured model. In contrast, the keyboard cover or enclosure of the present invention provides a simple, but elegant solution that overcomes such prior art limitations. For example, the versatility of the keyboard cover of the present invention allows the user easily to remove and retain the keyboard cover after using the keyboard. Thus, as the user travels, the cover is capable of being easily moved from one keyboard to another, and the user can avoid not only contamination of a keyboard but also the transmission of bacteria, disease carrying organisms or contaminants from one user to another. In other words, the keyboard cover can be considered to be personal to the user.

The keyboard cover of the present invention utilizes advanced materials that are elastomeric and strong even when employed as relatively thin membranes. They can be used in an unvulcanized state although, optionally, they can be crosslinked to permit the use of even thinner, but sufficiently strong membranes. However, it is intended that the membranes have a relatively uniform, albeit thin, cross-section that does not correspond to the depressions or elevations of a specific keyboard array. Instead, the present elastomeric keyboard cover or enclosure is stretched in use in order to fit over the keyboard, thereby providing a membrane that is in touching contact with one or more keys or is slightly elevated from the top surface of one or more keys, but in close proximity thereto; such spatial relationship between keyboard cover and key surface(s) hereinafter referred to as "proximate contact". When the keyboard user presses down on an individual key from the top surface of the keyboard cover, the elastomeric character of the keyboard cover membrane allows it to be extended in order to permit the user's finger to make contact with the desired key. After releasing the key, the area of the keyboard cover immediately above the key returns to its original state, in response to its elastomeric properties; in particular, a low level of hysteresis set. Therefore, the elastomeric membrane facilitates, but does not interfere with, the electronic or mechanical action of those keys intended to be activated by the operator. Furthermore, the membrane material is selected (originally, or as modified with compounding ingredients known to those skilled in the art) in order to have a relatively low modulus. In other words, requiring little force to extend the membrane in the area immediately above the key to be activated and not inadvertently activating neighboring keys that the operator intends to remain inactive. By designing the keyboard cover based on the teachings herein, and utilizing elastomeric properties of the keyboard cover material, a cover can be constructed so that the keys adjoining the depressed key are not inadvertently or unintentionally depressed as a consequence of the cover being present. In other words, the membrane physical properties, dimensions and structural elements of the cover are selected so that little stress is required to elongate the membrane immediately above the key when the operator depresses the desired key.

The enclosure of the present invention is an envelope-like protective cover for the keyboard, preferably constructed to provide a single overall body. While the cover is of a size that requires slight elongation or extension of the opening in order to permit the keyboard to be inserted, it has the characteristic of draping over or enshrouding the keyboard when used in its functional position. Furthermore, although a snug fit of the enclosure to the keyboard can be accommodated, depending on the sensitivity characteristics of the keys to be activated, it is preferred that there is a loose, but wrinkle-free fit of the protective keyboard cover on the top surface or deck of the keyboard that is nevertheless in touching contact with the sidewalls and obverse face of the keyboard. It has surprisingly been found that the cover of the present invention can be satisfactorily in place on the keyboard, in other words, in proximate contact with keyboard keys, for example, not in touching contact with keys in the central area of the keyboard, but in touching contact with the keys on the periphery of the keyboard deck, and not cause the peripheral keys to be unintentionally activated.

Elastomeric materials suitable for use in making the membrane for the keyboard cover include commercially available elastomers such as Kraton® (available from Shell Chemical Company, Houston, Tex.); Exact® (available from ExxonMobil Chemical Company, Houston, Tex.); Engage® (available from Dow Chemical Co., Freeport, Tex.) and Santoprene® (available from Advanced Elastomers Systems, Akron, Ohio); mixtures of these materials with one another and with other polymers can be used provided that they exhibit the necessary characteristics of elasticity, strength and transparency as described herein.

"Kraton" is the trademark for a family of elastomers and elastomer compositions comprising substantially fully hydrogenated, block copolymers based on blocks derived from predominantly monovinyl aromatic monomers having 8 to 20 carbon atoms and blocks derived from conjugated diene monomers having 4 to 8 carbon atoms. Suitable monovinyl aromatic monomers are exemplified by styrene and styrene homologs such as alpha-methylstyrene and para-methylstyrene; styrene is especially preferred. Suitable conjugated diene monomers are exemplified by 1,3-butadiene (butadiene) and 2-methyl-1,3-butadiene (isoprene), piperylene, etc. Preferred conjugated dienes are butadiene and isoprene, most preferably butadiene. The block copolymer comprises a poly(predominantly styrene) block and a poly(predominantly conjugated diene) block wherein the latter is predominantly butadiene or isoprene. Following hydrogenation, the preferred block copolymer compositions are also referred to as styrene-ethylene/butylene-styrene (SEBS) block copolymers; other suitable block copolymers include SBS. Useful block copolymers may have a linear, radial or star-shaped structures and do not require vulcanization in order to achieve many of the properties of conventional vulcanized elastomers as well as properties that are satisfactory for use in the present invention. Furthermore, the block copolymers can be blended with polyolefin thermoplastic resins, plastomers and elastomers to the extent that the required elastomeric properties described hereinabove are maintained. Examples of suitable, commercially available, selectively hydrogenated block copolymers are Kraton G 2705 and Kraton G 6578 or GRP6578; the latter is particularly preferred in view of its excellent elasticity with low hysteresis set.

"Exact" and "Engage" are polyolefin homopolymers or copolymers such as an ethylene alphaolefin copolymer that is also capable of exhibiting strength in unvulcanized form. There is a wide variety of commercial and experimental copolymers useful in the present application, including ethylene-propylene, ethylene-1-butene and other ethylene alphaolefin copolymers and ethylene copolymers of one or more $C_4$ to $C_{20}$ containing alphaolefins and combinations thereof. The level of comonomer present is that which results in a copolymer having the strength, elastomeric and transparency properties necessary to provide a suitable membrane.

"Santoprene" comprises a thermoplastic polyolefin homopolymer or copolymer and a dispersed phase of partially or substantially fully vulcanized rubber. The thermoplastic polymer can be one of those described above as well as others available commercially, and the dispersed rubbery material is similarly selected from commercial, vulcanizable elastomers.

With regard to each of the above classes of polymeric materials, the strength and clarity of the elastomer product will depend on the specific grade selected and the specific monomers that comprise the polymers and copolymers. However, it is well within the ability of one skilled in the art to select a suitable elastomeric material using the teachings of the instant disclosure and, in particular, based on a knowledge of preferred membrane characteristics. The particularly preferred elastomeric material for use in the present invention is selected from the "Kraton" family of products.

The elastomeric composition preferably comprises a slip or antiblock agent, uniformly dispersed in the elastomer or applied to the surface of the membrane comprising the keyboard cover to further improve handling of the membrane. For purposes of the present invention, a slip agent or antiblock agent means a substance added to the polymer composition to prevent adhesion or reduce tackiness of the surfaces of films made from the polymer to each other or to other surfaces. Materials suitable for this purpose include finely divided solids of a mineral nature such as silicate minerals and high melting waxes that "bloom" to the surface of the film, thus preventing adhesion, and/or reducing surface tack. Such agents include those in particulate form as well as liquid compositions comprising one or more surface treating agents or waxes compatible, at the concentrations employed, with the strength and/or transparency properties to be achieved in the present application. Common slip or antiblock agents suitable for processing polyolefin film can be used in the range of from about 0.5 to about 3.0 wt. % as slip or antiblock agent to yield good results. Compounds such as erucamide can provide the beneficial properties; suitable, commercially available products of this type include "Croda E" or "Croda ER" marketed by Croda Universal Inc. (Texas, U.S.A.). In addition to erucamide, other commonly known waxes employed in the polymer industry are also useful. These compounds differ from one another in the rate at which they come out of solution or dispersion in the polymer, commonly referred to as "blooming" to the surface. Preferred agents are those that bloom to the membrane surface soon after the cover is constructed; more preferably to a relatively constant concentration. Also useful for purposes of the present invention are low concentrations of polyolefin resins, provided that the concentration employed is such that the properties described herein are maintained. For example, including from about 2.0 to about 10 wt. %; preferably from about 3.0 to about 9.0 wt. %; more preferably from about 4.0 to about 5.0 wt. % linear low density polyethylene resin in the polymer composition can produce a film having reduced surface tackiness, and satisfactory strength, transparency or translucency, flexibility and low modulus.

Other materials characterized as antiblock agents for the purposes of this invention and suitable for use in treating the membrane surface are selected from the group consisting of small particle size powders such as talc and ethylene vinylacetate copolymer; and silicone- or wax-containing liquids. For example, a useful liquid composition containing both silicone and carnauba wax is "Behold" brand liquid furniture polish (distributed by Kiwi Brands, Douglasville, Pa., U.S.A.). Preferably the slip agent is talcum powder, erucamide or a silicone and/or wax containing liquid; mixtures of agents can also be used. The antiblock agent can be dispersed in the elastomer prior to extruding, molding, calendering or forming the membrane or it can be dispersed in the elastomer as part of, e.g., the extrusion process. For example, one method that can be used is to blend the agent into a portion of the polymer to produce a concentrate, for example about 30 wt. % of the agent in the polymer, and then to blend or let-down a small amount of the concentrate into the polymer used to produce the membrane during subsequent processing stages at a rate sufficient to achieve the desired level in the final product. Alternatively, the slip agent is applied to the surface of the membrane during or shortly after the operations referred to above or at the time the keyboard cover is formed. However such an agent is dispersed, if one is used it is necessary that the resulting membrane be sufficiently transparent or translucent in order to permit the keys of the deck to be visible to a sighted user through the membrane. For membranes intended to be used primarily in conjunction with a Braille system keyboard, transparency properties can be sacrificed, but the tactile properties of the membrane should not be unduly compromised. As is known to one skilled in the art, a low concentration of slip agent is sufficient to improve the handling characteristics of the membrane. Including a slip agent also modifies the surface characteristics of the resulting membrane so as to facilitate placing the keyboard within the membrane cover and to maintain or improve the "touch and feel" of the membrane during use. While it has been observed that ordinary talcum powder applied to the surface of the membrane, such as by brushing on, can partially accomplish these objectives, it is preferred that a powdered slip agent be dispersed in the elastomer in order to reduce the concentration required for improved handling while maintaining the transparency or translucency of the resulting membrane relative to a membrane without a slip agent. For the purposes of this invention, useful concentrations of a powdered slip agent are from about 0.05 to about 8 parts per hundred (pph) of the elastomer by weight; preferably from about 0.1 to about 5 pph; more preferably from about 0.1 to about 3 pph; for example from about 0.5 to about 3 pph. A slip agent in dilute, liquid form is usefully applied to the surface of the membrane, e.g., in the form of a spray during processing, in an amount to reduce the surface tackiness of the film while maintaining the properties as described above; the amount required can readily be determined without undue experimentation. Other additives well-known in the elastomer and plastics compounding art can also be included and dispersed in the elastomeric composition or applied to the membrane surface in order to further enhance the properties of the composition, e.g., antioxidants, antiozonants, extrusion and molding aids, etc.; provided that the essential features of elasticity, and where required, substantial transparency (of at least the top deck membrane), are not unduly compromised. Additionally, the use of an agent or additive should not interfere with or preclude construction of the protective cover as by, e.g., heat sealing separate membranes or panels (see below).

While it is a primary objective to cover the top deck of the keyboard, the present invention allows for variations in the extent of coverage of the keyboard by the protective cover. In one aspect, the top deck and two vertical side surfaces of the keyboard are covered, but engagement by the cover of the front and back vertical side surfaces of the keyboard can be minimal, i.e., minimally overlapping. In another embodiment, the keyboard top deck is covered as are all of the vertical side surfaces for their full height with the cover extending around the keyboard to and onto a portion of the obverse face of the keyboard (that portion of the cover extending to the obverse face is alternatively referred to as a tailpiece). Alternatively, the top deck and front and back vertical surfaces of the keyboard are substantially fully enclosed, but the vertical sides of the keyboard are minimally engaged by the cover; i.e., only to the extent necessary for the cover to remain on the keyboard during use.

Maximum keyboard coverage is offered wherein the bottom of the keyboard is also substantially or fully covered as, for example, wherein the keyboard is placed into the protective cover in a manner similar to a letter being placed in an envelope, with only an electrical cable or link (if present) exiting from a small opening in the envelope, e.g., from the rear vertical surface. The invention is particularly suited to those circumstances wherein the keyboard or keypad need not have a wire passing through the membrane or an opening in the membrane (for example, where a lightwave link is established or the keyboard comprises a self-contained calculator, computer or the like), and/or the membrane can be sealed against the keyboard or computer, for example, on the obverse side of the keyboard.

A fully enclosed keyboard is also achieved where, for example, the keyboard cover opening through which the keyboard is inserted is sealed using heat or a suitable adhesive after inserting the keyboard. The construction of an enclosed keyboard can be accomplished, for example, by the keyboard manufacturer or by the end user, with the careful application of heat to overlapping portions of the membrane at the opening for keyboard insertion. As noted, a fully enclosed keyboard is achievable in this manner using keyboards in which a linking, e.g., electrical, cable is not required or wherein further sealing means are used at the point where the cable passes through the cover (for example, by use of an overlapping, heat sealable piece of the membrane, flexible caulk, etc.).

In another aspect, the rear vertical surface of the cover is substantially open for ease of placing the keyboard in the protective cover. In still another aspect, the rearward vertical opening is substantially closed in that there is present one or more openings sufficient for necessary communication to external sources, e.g., wires or cables for electrical power, connections to a central processing unit of a computer, or an opening for an infrared link to another unit, etc.

Figure 1:
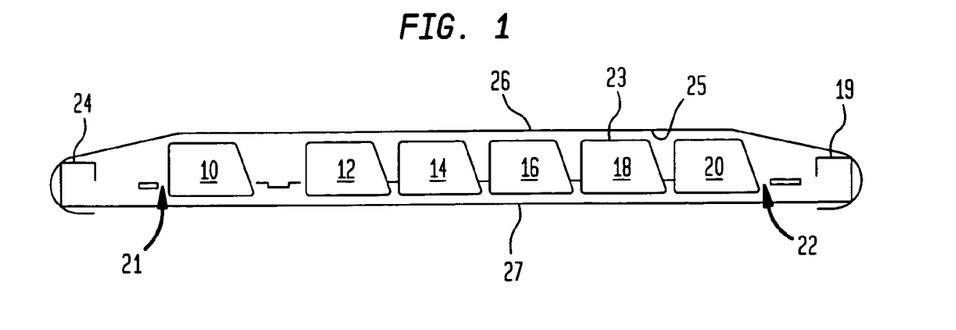
FIG. 1 is a partial, cross-sectional, schematic representation through a keyboard array and protective keyboard cover.

FIG. 1 illustrates a keyboard having a plurality of keys over which the protective keyboard cover membrane of the present invention has been applied. Although keyboard arrays vary from device-to-device they are usually arranged in a plurality of rows, occasionally containing columns so as to provide a two-dimensional array of individual keys. However, it is to be understood that the particular arrangement of individual keys in the key array is not part of the present invention as the keyboard cover of the invention is configured so as to permit it to be used with keyboards of various arrays.

Each of the keys 10, 12, 14, 16, 18 and 20 extend through the molded cover or keyboard housing of the top deck 19 and 24 of the keyboard assembly in a well known manner. Although not shown, it is to be understood that each of keys 10, 12, 14, 16, 18 and 20 may operate, either electronically or mechanically alone, or through intervening means (also not shown), so as to generate a signal to the device with which the keyboard is associated or linked. Furthermore, it will be appreciated that openings 21 and 22 exemplify the openings that exist between housing 19 and 24 and the keys of the keyboard array. Such openings permit entry of water, dust and other contaminants to the interior of the keyboard affecting the operation thereof. The obverse face of the keyboard is indicated at 27. In order to prevent the entry of such contaminants, the present invention utilizes a membrane 26, formed of an elastomeric material such as "Kraton" rubber. The elastomeric material is preferably transparent, but may be semi-transparent or substantially transparent (and as described earlier, transparency may not be a critical limitation, where, for example, the keyboard cover is used with a Braille system keyboard), so that the operator may visually view the indicia normally visible on the top surface of the individual keys. These indicia may be a numeral, or an alphabetic character, or a command symbol or a visual signal such as light, or a combination of the same.

The membrane form of material (film or sheet) used in the construction of the keyboard cover of the present invention can be extruded or calendered from the elastomeric composition. Other methods of forming may suitably be employed, including molding, transfer molding, thermoforming, extrusion blowing, extrusion casting, solvent casting and vacuum forming. Typical extrusion cast film conditions for Kraton include a melt temperature of 210° C. (410° F.) at the desired gauge or thickness described below.

By the use of a resilient material such as the aforementioned elastomers, the keyboard cover may be fashioned by conventional molding and construction techniques such as injection molding, transfer molding or vacuum forming techniques about an undercut core (not shown) or by the use of film heat sealing techniques well known in the art. Due to the resilient nature of the membrane, the core used to form the interior surface of the membrane may be extracted from the interior of the membrane by temporarily deforming the membrane so as to permit removal of the core. The core need not be made of multiple parts but may be of unitary construction with its exterior surface approximating the general exterior configuration of the keyboard assembly to be protected. Specific details of the keyboard deck need not be duplicated and, for ease of manufacture, membranes in small, medium and large sizes can conveniently be produced to facilitate use on an extraordinarily wide variety of keyboards.

Figure 2A:
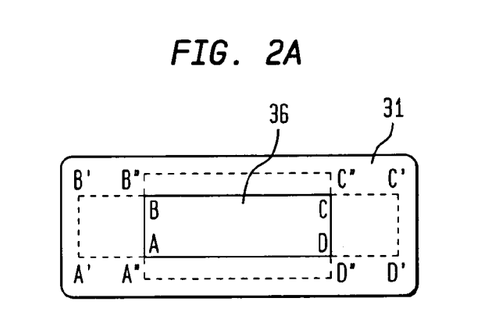
FIG. 2A is view of the obverse face of a keyboard showing details of alternative configurations of an opening in the keyboard protective cover overlying the obverse face of a keyboard.

A preferred means of forming the keyboard cover structure is heat sealing of extruded or calendered film, thus sealing the edges of individual panels, sheets or membranes of the elastomeric composition. The temperature selected is that which is suitable to heat seal the polymer composition. For example, it has been found that a keyboard cover can be constructed using membranes formed from Kraton GRP6578 that is heat sealed at about 90° C. (194° F.) to form an envelope- or pouch-like structure having an opening in the obverse face (as shown in FIG. 2A) to receive a keyboard.

For simplicity, the thickness of the membrane is substantially constant over the keyboard array, but for reasons of economics the key array cover portion of membrane 26 overlying the top deck or surface 23 of the keys can vary in thickness from the sidewall portions of the membrane extending over the vertical sides of the keyboard array and onto the obverse face. Similarly, the obverse face can vary in thickness. In particular, the membrane adjacent the top deck and keys can be thinner so as to allow improved "touch and feel" of the keys, provided that the membrane is not so thin that it is susceptible to failure as, e.g., by tearing, or being stretched so tightly across the top deck as to result in an undue downward force on the keys, causing them unintentionally to be depressed or activated. Although the membrane thickness, per se, is not critical, it has been found that a thickness of about 0.002 to about 0.005 inches (0.0508 to 0.127 mm) is suitable for the key cover portion of membrane 26 overlying the keys. Depending on the polymeric material selected, a thickness of from about 0.001 to about 0.02 inches (0.025 to 0.508 mm) is suitable; preferably from about 0.002 to about 0.010 inches (0.051 to 0.254 mm); more preferably from about 0.002 to about 0.005 inches (0.051 to 0.127 mm). Such thicknesses are particularly suitable where heat sealing is used to construct the keyboard cover using more than one film panel. The thickness may be varied to account for variations in conditions of use, impact, tearing and/or abrasion as well as the method used to construct the cover. In each instance, the performance requirements of the keyboard cover, as described herein, dictate the choice of cover thickness, particularly the thickness of the key covering panel.

The protective keyboard cover can be constructed using more than one type of elastomeric material and/or more than one composition based on such elastomers or blends. For example, the panel or membrane covering the top deck of the keyboard preferably is thin and, when necessary, essentially or substantially transparent, resulting in improved touch and feel, and requiring less force to effect extension of the membrane when a key is depressed. In contrast, the obverse face and sidewalls can be less transparent, or even opaque, as well as exhibiting physical properties requiring greater force to effect extension of the membrane. Preferably, for ease of fabrication, the protective cover is constructed from a single composition of uniform thickness.

Figure 2B:
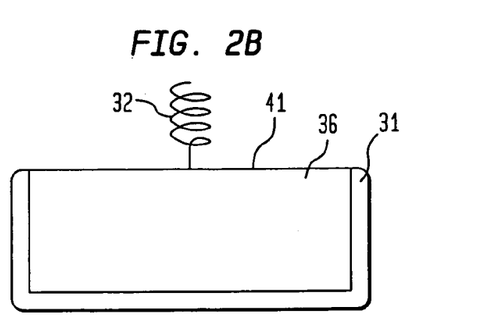
FIG. 2B is view of the obverse face of a keyboard showing details of an alternative configuration having an opening along one side of the periphery in the keyboard protective cover.

Referring to FIG. 2B, it has been found useful to form the portion 31 of membrane 26 overlying the obverse portion of the keyboard 19 of a thickness comparable to that of key cover portion 26. The present invention maintains the "touch" or "feel" of the individual keys by employing a membrane of relatively thin and uniform thickness overlying the keys. In order to prevent the loss of the "touch" or "feel" when utilizing a keyboard array covered with a membrane of the present invention it is preferred that the relative distance between the membrane and the top of the keys not be permitted to become excessively large; that distance can readily be determined without undue experimentation. Alternatively, it has been found that the membrane 26 can be in touching contact with the keys and the keyboard performance will not be impaired. In other words, as previously stated the keyboard cover is preferably in proximate contact with the top surface of one or more keyboard keys.

In order to assure that little force is required by the operator to move the membrane adjacent the top surface of the key 23 thereby maintaining the "touch" or "feel" of each key, it is preferred that the lower surface of the membrane 25 is in close proximity to the top surface of the key. Thus, in a one embodiment of the invention, the height of the membrane above the keys (measured in the central portion of the deck) is from greater than about zero (in other words, just displaced from touching contact with the key) to about ½ inch (about 0+ to about 12.7 mm); preferably from greater than about zero to about 8/32 inch (about 0+ to about 6.35 mm); more preferably from greater than about zero to about 3/32 inch (about 0+ to about 2.38 mm). In another preferred embodiment, the bottom surface of the membrane 25 is in touching contact with the top surface of the keys 23 provided that the force exerted on the keys is less than that required to activate the keys in the absence of an intended action by the operator. Furthermore, it should be appreciated that the displacement of the membrane from the top of the keys need not be the same, and typically will not be the same, in all areas of the top deck. For example, where the membrane is in tension across the top deck of the keyboard, it is to be expected that the membrane is closer, or in touching contact, with the keys near the perimeter of the keyboard compared with those in the center area of the keyboard. In the circumstance where the cover is draped across the top deck of the keyboard, it is typically in touching contact with most, if not all of the keys.

Thus, it will be appreciated that when a key is actuated by pressing key cover portion 26 of the membrane, the membrane will deform, and there may be incidental contact of the membrane with adjacent keys, but such keys will not be sufficiently compressed so as to cause them unintentionally to be activated. One method of achieving such a response is to drape or enshroud the membrane over the keys of the top deck in which case the membrane exerts minimal force on the keys in their unactivated condition.

As shown in FIG. 2B, a view from the obverse side of the keyboard, the protective keyboard cover is conveniently constructed so as to permit the means used to connect the keyboard to its electronic receiver, e.g., a cable or wire connection to a personal computer, central processing unit, mainframe computer, etc., to pass through an opening 41 in the cover. Alternatively, a window is provided in the cover to permit the keyboard to link to such receiver by light waves, e.g., in the infrared region of the spectrum or by the use of laser light. In the latter circumstances, the window can be an opening or, alternatively, a clear portion of the membrane through which the light wave passes. Still another linking means utilizes an electronic or audio signal passing to or from the keyboard through the keyboard cover while the latter is in its operative, covering position.

FIGS. 2A and 2B illustrate variations of the protective keyboard membrane cover as viewed from the obverse surface of the keyboard; in each instance, the top deck, containing the key array, is completely covered by the protective membrane. FIG. 2A includes an opening ABCD in the membrane 31 to permit passage of the keyboard into the protective membrane by stretching the opening. Alternative configurations A'B'C'D' and A"B"C"D" illustrate different opening configurations in the obverse of the keyboard cover, allowing differing degrees of coverage of the obverse face of the keyboard and differing degrees of ease of passage of the keyboard into the protective cover. In another embodiment illustrated in FIG. 2B, one vertical side of the protective cover adjoining the obverse face is not fully enclosed, thus facilitating the passage of at least one external connection 32 such as a power cord, computer cable or light link.

Figure 3:
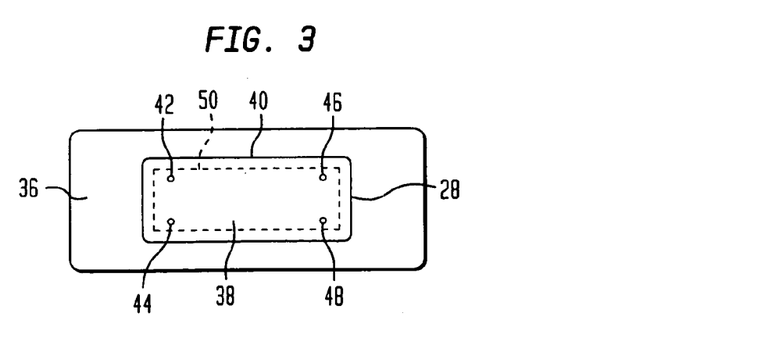
FIG. 3 is a schematic representation of the obverse face of the keyboard assembly illustrating the arrangement of the sealing plate and membrane cover.

FIG. 3 illustrates an alternative embodiment of the invention in which it is desired to completely enclose the keyboard assembly by means of a protective keyboard membrane. As is shown in FIG. 3 the keyboard assembly 36 is completely covered with membrane 24 except for opening 38. Opening 38 exposes the obverse portion of the keyboard assembly 36 but it is otherwise completely encapsulated by membrane 28. A means such as a metal or plastic plate 40 may be fastened to the keyboard assembly by means of suitable fastening devices, such as screws 42, 44, 46, and 48, so as to compress the tailpiece 50 of membrane 28 between plate 40 and the obverse face of the keyboard assembly 36. Such compression permits membrane 28 to act as a seal thereby completely enclosing the keyboard from outside contaminants such as water, dust, etc.

It will therefore be appreciated that the present invention provides a membrane cover or boot for a keyboard array that significantly reduces the chance of contamination of the key surfaces as well as the interior of the keyboard assembly from the top deck by encapsulating, draping or enshrouding the deck of the keyboard. Additionally, the membrane can be constructed so as to substantially seal the keyboard, either by sealing the membrane against itself, such as by heat sealing or by employing a membrane in combination with metal or plastic sealing means such as a plate or cover on the face of the keyboard assembly obverse the keys. Additionally, the present invention permits the retention of the "touch" or "feel" of the individual keys by the operator even when the keyboard cover is in its operative position on the keyboard array.

In another embodiment of the invention, the facile application and removal of the keyboard cover to the keyboard permits a user readily to enclose a keyboard with a personal keyboard cover for transient use of the keyboard and thereafter easily to remove the cover and retain it. Such an application has not previously been available to those who, for example, need to use equipment available to the public (as in a hotel business facility) or to use equipment on lease or loan. Furthermore, it permits a user readily to apply a personal keyboard cover to a keyboard in order to avoid the risk of contamination by prior, unknown users of the keyboard.

In a further embodiment of the invention, the keyboard cover is used with keyboards that utilize the Braille system of markings or key construction that includes raised spots or protuberances on the keys in order to assist those with impaired sight. The keyboard cover of the present invention retains a surprisingly significant level of touch and feel such that such key markings or construction can readily be sensed through the cover. Keyboard covers made specifically for such use will not require the same degree of transparency as discussed above, but will require heightened sensitivity or touch and feel. As discussed herein, having identified particular needs and target properties, the balance of elastomer properties can be adjusted without undue experimentation in order to suit a particular keyboard application.

Significantly, the present invention permits the capture of economics of scale and distribution by the use of a "one size fits all" (or a few sizes fit substantially all) approach as well as inexpensive methods of manufacture. The materials of construction are also suitable for providing compatibility in food and medical applications in order to permit the use of keyboard covers in environments subject to specific regulatory requirements.

It will be understood that modifications and variations may be affected without departing from the scope of the novel concepts of the present invention, but it is understood that this application is to be limited only by the scope of the appended claims.

What is claimed is:

1. A protective enclosure or cover for a keyboard assembly having a plurality of keys on a top face thereof, and an obverse face opposite said top face and, optionally, a means to provide communication between said keyboard and an external device; said enclosure having a stretchable envelope-like structure comprising at least a top panel, two vertical side panels, a vertical front panel and a vertical rear panel, said enclosure of a size to receive said keyboard when said enclosure is minimally stretched, wherein said top panel comprises a thin, elastomeric and substantially transparent membrane in proximate contact with said keys of said keyboard, provided that said top panel cross-section does not correspond to the depressions or elevations of a specific keyboard array, wherein said cover retains a significant level of the touch or feel of the keyboard keys underlying said cover.

2. The enclosure of claim 1 comprising a substantially homogeneous elastomeric composition.

3. The enclosure of claim 1 wherein the elastomeric composition of said side panels has less elasticity and/or transparency than said top panel.

4. The enclosure of claim 1 wherein said enclosure includes an obverse face overlaying at least a portion of said obverse keyboard face.

5. The enclosure of claim 4 wherein said obverse enclosure face overlays a substantial portion of said obverse keyboard face and said obverse enclosure face further includes an opening that, when stretched, permits entry of said keyboard.

6. The enclosure of claim 5 wherein at least one of the elastomeric compositions of said obverse enclosure face and/or side panels have less elasticity and/or transparency than said top panel.

7. The enclosure of claim 1 wherein said keyboard further comprises at least one communication means between said keyboard and an external device.

8. The enclosure of claim 7 wherein at least one of said panels includes an opening to permit the passage therethrough of an electrically conducting cord or cable, or the transmission of a light beam to or from said keyboard.

9. The enclosure of claim 7 comprising a clear portion through which a light beam can pass.

10. The enclosure of claim 1 wherein said elastomer is selected from the group consisting of substantially hydrogenated, block copolymers based on blocks derived from predominantly monovinyl aromatic monomers having 8 to 20 carbon atoms and blocks derived from conjugated diene monomers having 4 to 8 carbon atoms; elastomeric polyolefin homopolymers or ethylene alphaolefin copolymers; and thermoplastic polyolefin homopolymers or copolymers wherein said thermoplastic homopolymers or copolymers include a dispersed phase of partially or substantially fully vulcanized rubber.

11. The enclosure of claim 10 wherein said elastomer further comprises an antiblock agent.

12. The enclosure of claim 11 wherein said antiblock agent is selected from the group consisting of small particle size inorganic or organic powders and liquid compositions comprising at least one of wax and silicone.

13. The enclosure of claim 12 comprising a block copolymer of derived from blocks of styrene and butadiene wherein said block copolymer has been substantially hydrogenated.

14. The enclosure of claim 13 wherein said block copolymer is a styrene-ethylene/butylene-styrene block copolymer.

15. The enclosure of claim 13 wherein said obverse enclosure face overlays a substantial portion of said obverse keyboard face and said obverse enclosure face further includes an opening that, when stretched, permits entry of said keyboard; wherein at least one of said vertical panels includes an opening or can be stretched to permit the passage therethrough of an electrically conducting cord or cable, or the transmission of a light beam to or from said keyboard.

16. The enclosure of claim 1 wherein the top surfaces of said keys comprises Braille system indicators.

17. The enclosure of claim 1 wherein at least said top panel comprises a low modulus elastomer.

18. A structure comprising a keyboard assembly and a protective enclosure therefore, wherein said keyboard assembly has a plurality of keys on a top face thereof, and an obverse face opposite said top face and, optionally, a means to provide communication between said keyboard and an external device; and wherein said enclosure has a stretchable envelope-like structure comprising at least a top panel, two vertical side panels, a vertical front panel and a vertical rear panel, said enclosure of a size to receive said keyboard when said enclosure is only minimally stretched, wherein said top panel comprises a thin, elastomeric and substantially transparent or translucent membrane in proximate contact with said keys of said keyboard, provided that said top panel cross-section does not correspond to the depressions or elevations of a specific keyboard array, wherein said cover retains a significant level of the touch or feel of the keyboard keys underlying said cover.

19. A method comprising having said at least one user apply to a keyboard prior to use thereof, and removing prior to use of said keyboard by another user, of a personal, easily removable keyboard cover to said keyboard by said user, said cover comprising a protective enclosure or cover for a keyboard assembly having a plurality of keys on a top face thereof, and an obverse face opposite said top face and, optionally, a means to provide communication between said keyboard and an external device; said enclosure having a stretchable envelope-like structure comprising at least a top panel, two vertical side panels, a vertical front panel and a vertical rear panel, said enclosure of a size to receive said keyboard when said enclosure is only minimally stretched, wherein said top panel comprises a thin, elastomeric and substantially transparent or translucent membrane in proximate contact with said keys of said keyboard, wherein said cover retains a significant level of the touch or feel of the keyboard keys underlying said cover and wherein said method avoids the transmission of disease carrying organisms between said at least one user and said other users of said keyboard.

\* \* \* \* \*

UNITED STATES PATENT AND TRADEMARK OFFICE
CERTIFICATE OF CORRECTION

PATENT NO. : 6,962,454 B1 Page 1 of 1
DATED : November 8, 2005
INVENTOR(S) : Pamella A. Costello It is certified that error appears in the above-identified patent and that said Letters Patent is hereby corrected as shown below:

Title page,
Item [57], ABSTRACT,
Line 18, "is" should read -- are --.
Line 27, "permits" should read -- permit --.

Column 1,
Line 29, "generates" should read -- generate --.

Column 5,
Line 5, "cause" should read -- causing --.
Line 37, "structures" should read -- structure --.

Column 8,
Line 50, "extend" should read -- extends --.

Figure 4:
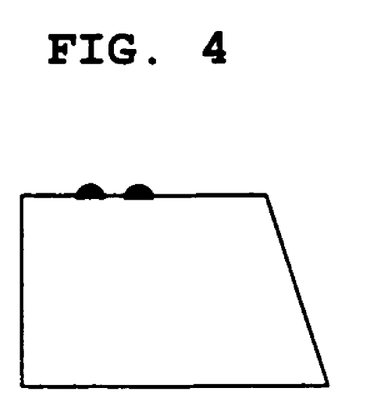
FIG. 4 is a cross-sectional illustration of the top surface of a keyboard key having a Braille system top surface.

Column 12,
Line 6, "permits" should read -- permit --.
Line 20, after "sight" insert -- as schematically illustrated in Fig. 4 --.

Column 13,
Line 8, "have" should read -- has --.
Line 37, delete the first occurrence of -- of --.

Signed and Sealed this

Twenty-first Day of March, 2006

JON W. DUDAS
*Director of the United States Patent and Trademark Office*